United States Patent
Ahmed

(10) Patent No.: US 7,668,394 B2
(45) Date of Patent: Feb. 23, 2010

(54) BACKGROUND INTENSITY CORRECTION OF A SCAN OF A DOCUMENT

(75) Inventor: Mohamed Ahmed, Louisville, KY (US)

(73) Assignee: Lexmark International, Inc., Lexington, KY (US)

( * ) Notice: Subject to any disclaimer, the term of this patent is extended or adjusted under 35 U.S.C. 154(b) by 709 days.

(21) Appl. No.: 11/314,934

(22) Filed: Dec. 21, 2005

(65) Prior Publication Data

US 2007/0140577 A1 Jun. 21, 2007

(51) Int. Cl.
*G06K 9/00* (2006.01)
(52) U.S. Cl. .................. 382/274; 382/168; 382/173
(58) Field of Classification Search ............. 382/171, 382/173, 176, 274, 292, 299, 168, 169, 172; 358/462, 464

See application file for complete search history.

(56) References Cited

U.S. PATENT DOCUMENTS

| | | | |
|---|---|---|---|
| 4,593,325 A | 6/1986 | Kannapell et al. | |
| 5,086,485 A | 2/1992 | Lin | |
| 5,093,871 A * | 3/1992 | Klein et al. | 382/172 |
| 5,555,556 A | 9/1996 | Ozaki | |
| 5,751,848 A | 5/1998 | Farrell | |
| 5,835,628 A | 11/1998 | Farrell | |
| 5,848,183 A | 12/1998 | Farrell | |
| 5,850,298 A | 12/1998 | Narahara et al. | |
| 5,881,166 A | 3/1999 | Farrell | |
| 5,889,885 A * | 3/1999 | Moed et al. | 382/172 |
| 5,956,468 A * | 9/1999 | Ancin | 358/1.9 |
| 6,222,642 B1 * | 4/2001 | Farrell et al. | 358/1.9 |
| 6,323,957 B1 | 11/2001 | Ball | |
| 6,674,899 B2 | 1/2004 | Nagarajan et al. | |
| 6,944,353 B2 | 9/2005 | Matsuda | |
| 2003/0072487 A1 | 4/2003 | Fan et al. | |
| 2004/0037473 A1 | 2/2004 | Ahmed et al. | |

FOREIGN PATENT DOCUMENTS

| | | |
|---|---|---|
| JP | 06-251149 | 9/1994 |
| JP | 2001-160903 | 6/2001 |
| JP | 2003-016448 | 1/2003 |

* cited by examiner

*Primary Examiner*—Phuoc Tran

(57) ABSTRACT

One exemplary method of the present invention is for background intensity correction of a scan of pixel values of a document, wherein the scan has at least one background pixel area and at least one non-background pixel area. The method includes segmenting the scan into the at least one background pixel area and the at least one non-background pixel area. The method also includes calculating a gray background pixel value of at least a portion of the scan. The method also includes compensating only the pixel values of the at least one background pixel area for background intensity using the calculated gray background pixel value.

20 Claims, 1 Drawing Sheet

BACKGROUND INTENSITY CORRECTION OF A SCAN OF A DOCUMENT

TECHNICAL FIELD

The present invention relates generally to scanners, and more particularly to a method for background intensity correction of a scan of pixel values of a document.

BACKGROUND OF THE INVENTION

Scanners are used to create a scan of pixel values of a document. The scan can be displayed on a computer monitor, can be used by a computer program, can be printed, can be faxed, etc. A first conventional method for scanning a document uses a scanner including a horizontal scan bar having sensor elements (such as CCD [charge-coupled-device] elements). A document on the scanning area of the scanner is scanned by the scan bar. With the scan bar stationary, the scanner obtains pixel values from the sensor elements for corresponding pixel locations of a portion of the document along the horizontal scan line of the scan bar. The scan bar is moved vertically for vertically-displaced successive horizontal scan lines until a scan of the entire document is obtained. In a second conventional method, the scan bar always remains stationary, and the document is scanned by moving the document past the scan bar.

In one known extension of the first and second conventional methods, the pixel values of the scan of the entire document are compensated for background intensity using a calculated gray background pixel level.

Conventional scanning methods include detection of the edges of the document being scanned to exclude from the scan those pixel values obtained from outside the edges of the document. Conventional scanning methods also include segmenting the scan into text pixel areas (such letters and punctuation marks) which are mathematically sharpened, using a sharpening filter, to improve the appearance of the text. Conventional scanning methods further include segmenting the scan into image pixel areas which are mathematically smoothed, using a smoothing filter, to improve the appearance of the image.

What is needed is an improved method for background intensity correction of a scan of pixel values of a document.

SUMMARY OF THE INVENTION

A first method of the present invention is for background intensity correction of a scan of pixel values of a document wherein the scan has at least one background pixel area and at least one non-background pixel area. The first method includes segmenting the scan into the at least one at least one background pixel area and the at least one non-background pixel area. The first method also includes calculating a gray background pixel value of at least a portion of the scan. The first method also includes compensating only the pixel values of the at least one background pixel area for background intensity using the calculated gray background pixel value.

A second method of the present invention is for background intensity correction of a scan of pixel values of a document wherein the scan has at least one background pixel area and at least one non-background pixel area and wherein the at least one non-background pixel area includes at least one text pixel area and at least one image pixel area. The second method includes segmenting the scan into the at least one background pixel area, the at least one text pixel area, and the at least one image pixel area. The second method also includes calculating a gray background pixel value of at least a portion of the scan. The second method also includes compensating only the pixel values of the at least one background pixel area for background intensity using the calculated gray background pixel value.

A third method of the present invention is for background intensity correction of a scan of pixel values of a document wherein the scan has at least one background pixel area and at least one non-background pixel area. The third method includes segmenting the scan into the at least one background pixel area and the at least one non-background pixel area. The third method also includes calculating a gray background pixel value of at least a portion of the scan. The third method also includes compensating only the pixel values of the at least one background pixel area for background intensity using the calculated gray background pixel value. The segmenting of the scan includes separating the pixel values into background pixels and non-background pixels and includes extracting pixels. The separating of the pixel values into background pixels and non-background pixels includes creating a binary image of the scan using an adaptive thresholding process. The extracting of the pixels includes using binary morphology to extract each area of connected pixels which belongs to one of a connected background pixel area and a connected non-background pixel area.

DETAILED DESCRIPTION

Figure 1:
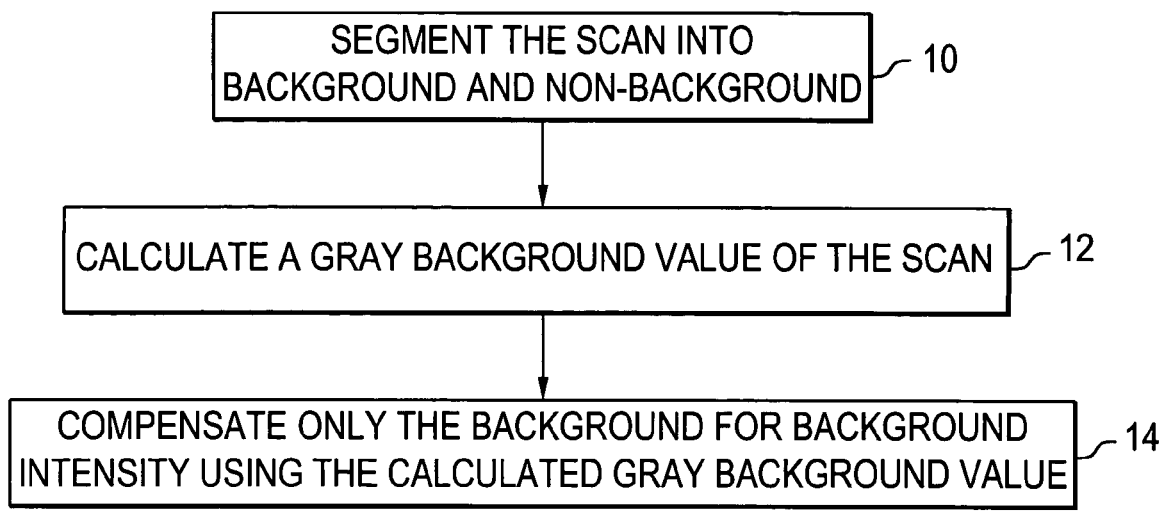
FIG. 1 is a block diagram of a first method of the invention.

FIG. 1 is a block diagram of a first exemplary method of the present invention, which corrects background intensity of a scan of pixel values of a document wherein the scan has at least one background pixel area and at least one non-background pixel area. The first method includes segmenting the scan into the at least one background pixel area and the at least one non-background pixel area. Such segmenting is summarized by block 10 of FIG. 1. The first method also includes calculating a gray background pixel value of at least a portion of the scan. Such calculating is summarized by block 12 of FIG. 1. The first method also includes compensating only the pixel values of the at least one background pixel area for background intensity using the calculated gray background pixel value. Such compensating is summarized by block 14 of FIG. 1.

It is noted that the above-described "segmenting", "calculating", and "compensating" are within the ordinary level of skill of the artisan. For purposes of describing any of the exemplary methods of the present invention, the term "scan" includes a scan obtained using a scanner or a digital camera having two-dimensional pixel sensor arrays. Also, the terminology "non-background pixel area" includes text and image, and the terminology "background pixel area" does not include text and does not include image (whether the so-called background or foreground of an image). Examples of text include, without limitation, the dark area of a letter, a number, a punctuation mark, a mathematical symbol, etc. Examples, without limitation, of an image are photographs of a person's face and graphics such as logos. Examples of a background pixel area include, without limitation, an area within the letter "O", an area between two consecutive letters of a word, the area surrounding an image, etc. The terminology "gray background" includes gray background and includes background color. Any of the exemplary methods of the present invention have application in black and white scanners and in color scanners, as can be appreciated by those skilled in the art.

In one enablement of the first exemplary method, the calculating of the gray background pixel value includes calculating the gray background pixel value of at least some of the pixels of a strip of pixels of a plurality of scan lines proximate a leading edge of the document. In one variation, the calculating of the gray background pixel value includes calculating the gray background pixel value of all of the pixels of the strip. In a different variation, the calculating of the gray background pixel value includes calculating the gray background pixel value of only background pixels of the strip.

In one employment of the first exemplary method, there is also included down sampling of the scan, wherein the segmenting of the scan includes segmenting the down-sampled scan into the at least one background pixel area and the at least one non-background pixel area. In one example, the down sampling of the scan uses a down sampling ratio of four to one.

In one application of the first exemplary method, the segmenting of the scan includes separating the pixel values into background pixels and non-background pixels, includes extracting each area of connected non-background pixels, and includes labeling each un-extracted area of connected background pixels as belonging to the at least one background pixel area. In a different application, the segmenting of the scan includes separating the pixel values into background pixels and non-background pixels, includes extracting each area of connected background pixels, and includes labeling each extracted area of connected background pixels as belonging to the at least one background pixel area. In one variation of either application, the separating of the pixel values into background pixels and non-background pixels includes creating a binary image of the scan using an adaptive thresholding process.

A second exemplary method of the present invention is for background intensity correction of a scan of pixel values of a document wherein the scan has at least one background pixel area and at least one non-background pixel area and wherein the at least one non-background pixel area includes at least one text pixel area and at least one image pixel area. The second method includes segmenting the scan into the at least one background pixel area, the at least one text pixel area, and the at least one image pixel area. The second method includes calculating a gray background pixel value of at least a portion of the scan. The second method includes compensating only the pixel values of the at least one background pixel area for background intensity using the calculated gray background pixel value.

In one enablement of the second exemplary method, the calculating of the gray background pixel value includes calculating the gray background pixel value of at least some of the pixels of a strip of pixels of a plurality of scan lines proximate a leading edge of the document. In one variation, the calculating of the gray background pixel value includes calculating the gray background pixel value of all of the pixels of the strip. In a different variation, the calculating of the gray background pixel value includes calculating the gray background pixel value of only background pixels of the strip.

In one employment of the second exemplary method, there is also included down sampling of the scan, wherein the segmenting of the scan includes segmenting the down-sampled scan into the at least one background pixel area and the at least one non-background pixel area. In one example, the down sampling of the scan uses a down sampling ratio of four to one.

In one application of the second exemplary method, the segmenting of the scan includes separating the pixel values into background pixels and non-background pixels, includes extracting each area of connected non-background pixels, includes labeling each unextracted area of connected background pixels as belonging to the at least one background pixel area, and includes labeling each extracted area of connected non-background pixels as belonging to one of a text pixel area and an image pixel area. In a different application, the segmenting of the scan includes separating the pixel values into background pixels and non-background pixels, includes extracting each area of connected background pixels, includes labeling each extracted area of connected background pixels as belonging to the at least one background pixel area, and includes labeling each unextracted area of connected non-background pixels as belonging to one of a text pixel area and an image pixel area. In one variation of either application, the separating of the pixel values into background pixels and non-background pixels includes creating a binary image of the scan using an adaptive thresholding process.

A third exemplary method of the present invention is for background intensity correction of a scan of pixel values of a document wherein the scan has at least one background pixel area and at least one non-background pixel area. The third method includes segmenting the scan into the at least one background pixel area and the at least one non-background pixel area. The third method also includes calculating a gray background pixel value of at least a portion of the scan. The third method also includes compensating only the pixel values of the at least one background pixel area for background intensity using the calculated gray background pixel value. The segmenting of the scan includes separating the pixel values into background pixels and non-background pixels and includes extracting pixels. The separating of the pixel values into background pixels and non-background pixels includes creating a binary image of the scan using an adaptive thresholding process. The extracting of the pixels includes using binary morphology to extract each area of connected pixels which belong to one of a connected background pixel area and a connected non-background pixel area.

In one application of the third exemplary method, there is also included labeling each connected non-background pixel area as belonging to one of a text pixel area and an image pixel area using a size and an aspect ratio of each connected non-background pixel area. In one example, a small size non-background pixel area having a square-like height-to-width aspect ratio is labeled as a text pixel area and a large size non-background pixel area having a small (substantially less than one) height-to-width aspect ratio is labeled as an image pixel area. Other examples are left to the artisan. In one extension, the third method includes using a sharpening filter to sharpen each text pixel area and includes using a smoothing filter to smoothen each image pixel area.

The following paragraphs describe in greater detail an example of one enablement of background removal or correction using any of the first, second and third exemplary methods of the present invention.

Document segmentation may involve several actions, such as down-sampling, thresholding, connected components extraction, and component labeling.

The document may optionally be down-sampled to decrease the size of the document image. Although optional, down-sampling can be useful to limit the number of computations. Research results indicate that a ratio of 4:1 was adequate.

The resulting image may then undergo a thresholding process to separate the document elements from the background. An adaptive thresholding technique is used to accomplish this separation. The following algorithm, in which the intensity distribution is assumed to be bimodal, may be used to select the threshold automatically:

(a) An initial threshold T is selected.

(b) The document image is segmented using T. This would produce two groups of pixels: $G_1$ consisting of all pixels with values>T and $G_2$ consisting of all pixels with values<T. Pixels having a value equal to T may be placed with either group, $G_1$ or $G_2$.

(c) The average value $\mu_1$, and $\mu_2$ for the two groups is computed.

(d) A new threshold value is computed using the following formula:

$$T = \frac{1}{2}(\mu_1 + \mu_2)$$

(e) Actions (b) through (d) are repeated until the difference between successive iterations is smaller than a predefined parameter $T_o$.

(f) All pixels in $G_1$ are assigned a value "1", and all pixels in $G_2$ are assigned "0", thereby resulting in the creation of a binary image of the scan.

Connected "1" pixels (connected components having the value "1") or connected "0" pixels (connected components having the value "0") of the binary scan may then be extracted from the previously obtained binary image of the scan. One illustrative method to extract connected pixels is binary morphology. Starting with a seed pixel p in the binary image I, the following iterative algorithm would yield all pixels connected to p:

$$X_k = (X_{k-1} \oplus B) \cap I \text{ where } X_0 = p,$$

where $\oplus$ refers to the binary dilation operation, and B is a 3×3-structuring element $$B = \begin{bmatrix} 1 & 1 & 1 \\ 1 & 1 & 1 \\ 1 & 1 & 1 \end{bmatrix}$$

This algorithm is repeated until all like connected pixels (e.g., all connected "1" pixels or all connected "0" pixels) are extracted. It will be appreciated by those skilled in the art that other known methods can also be used to extract all connected components.

The connected components may then be labeled. First, the number of pixels and the bounding box of each connected component may be determined. Then, depending on the size and the aspect ratio of each connected component (i.e., area of connected "1" pixels or area of "0" pixels of the binary image), a label (text, image, or background) is assigned. Large areas of connected "0" pixels of the binary image are labeled as background pixels. Large, spread areas of connected "1" pixels of the binary image are labeled as image pixels. Small, square-like areas of connected "1" pixels of the binary image are labeled as text pixels.

A gray background level may be calculated by selecting a strip of pixels of size M scan lines near the leading edge of the document and calculating the histogram H of the strip using the following equation:

$$H_1(l) = \sum_{i=1}^{M} \sum_{j=1}^{W} [f(i,j) = l] \quad 0 \le l \le 255,$$

where W is the line width and f(i, j) is the intensity at pixel (i, j). A typical value for M is 64. The histogram may also be calculated from only pixels classified as background pixels.

The gray background pixel level at which the histogram is maximum (peak) $P_1$ may be calculated using the following equation:

$$P_1 = \min\{g | H_1(g) > H_1(i) \text{ for all } i > T\},$$

where T is a predefined threshold. This calculation ensures that the document is not a dark document on a dark background. A typical value of T is around intensity 180.

Then, compensation (correction) for background intensity of only the background pixels of the scan is performed. Background pixels are corrected by stretching their values to the range [0:$P_1$].

$$g(i,j) = \begin{cases} 255 & \text{if } f(i,j) \ge P_1 \\ \dfrac{255 f(i,j)}{P_1} & \text{else} \end{cases}$$

Where g (i, j) is the output intensity.

Several benefits and advantages are derived from the exemplary methods of the present invention. In one example, by performing background intensity correction only on background pixels and not on non-background pixels (such as text pixels and image pixels), text areas remain dark and saturated, image areas remain intact, and background areas are adequately corrected.

The foregoing description of several exemplary methods of the present invention has been presented for purposes of illustration. It is not intended to be exhaustive or to limit the invention to the precise actions and/or forms disclosed, and obviously many modifications and variations are possible in light of the above teaching. It is intended that the scope of the invention be defined by the claims appended hereto.

What is claimed is:

1. A method for background intensity correction of a scan of pixel values of a document, the scan having at least one background pixel area and at least one non-background pixel area, comprising:

segmenting the scan into the at least one background pixel area and the at least one non-background pixel area;

calculating a gray background pixel value of the at least one background pixel area, wherein the calculating depends upon at least one peak in a histogram of the pixel values of the at least one background pixel area; and compensating only the pixel values of the at least one background pixel area for background intensity using the calculated gray background pixel value, wherein pixels in the at least one background pixel area are compensated by stretching the pixel values between zero and the at least one peak in the histogram, wherein at least one of the segmenting, calculating and compensating is performed by a scanning apparatus.

2. The method of claim 1, wherein the calculating of the gray background pixel value comprises calculating the gray background pixel value of at least some of the pixels of a strip of pixels of a plurality of scan lines proximate a leading edge of the document.

3. The method of claim 1, wherein the calculating of the gray background pixel value comprises calculating the gray background pixel value of all of the pixels of a strip.

4. The method of claim 1, wherein the calculating of the gray background pixel value comprises calculating the gray background pixel value of only background pixels of a strip.

5. The method of claim 1, further comprising down sampling the scan, wherein the segmenting of the scan includes segmenting the down-sampled scan into the at least one background pixel area and the at least one non-background pixel area.

6. The method of claim 5, wherein the down sampling of the scan uses a down sampling ratio of four to one.

7. The method of claim 1, wherein the segmenting of the scan comprises:
separating the pixel values into background pixels and non-background pixels;
extracting each area of connected non-background pixels; and
labeling each un-extracted area of connected background pixels as belonging to the at least one background pixel area.

8. The method of claim 1, wherein the segmenting of the scan comprises:
separating the pixel values into background pixels and non-background pixels;
extracting each area of connected background pixels; and
labeling each extracted area of connected background pixels as belonging to the at least one background pixel area.

9. The method of claim 8, wherein the separating of the pixel values into background pixels and non-background pixels comprises creating a binary image of the scan using an adaptive thresholding process.

10. A method for background intensity correction of a scan of pixel values of a document, the scan having at least one background pixel area and at least one non-background pixel area, the at least one non-background pixel area including at least one text pixel area and at least one image pixel area, comprising:
segmenting the scan into the at least one background pixel area, the at least one text pixel area, and the at least one image pixel area;
calculating a gray background pixel value of the at least one background pixel area, wherein the calculating depends upon at least one peak in a histogram of the pixel values of the at least one background pixel area; and
compensating only the pixel values of the at least one background pixel area for background intensity using the calculated gray background pixel value, wherein pixels in the at least one background pixel area are compensated by stretching the pixel values between zero and the at least one peak in the histogram,
wherein at least one of the segmenting, calculating and compensating is performed by a scanning apparatus.

11. The method of claim 10, wherein the calculating of the gray background pixel value comprises calculating the gray background pixel value of at least some of the pixels of a strip of pixels of a plurality of scan lines proximate a leading edge of the document.

12. The method of claim 10, wherein the calculating of the gray background pixel value comprises calculating the gray background pixel value of all of the pixels of a strip.

13. The method of claim 11, wherein the calculating of the gray background pixel value comprises calculating the gray background pixel value of only background pixels of a strip.

14. The method of claim 10, further comprising down sampling the scan, wherein the segmenting of the scan includes segmenting the down-sampled scan into the at least one background pixel area and the at least one non-background pixel area.

15. The method of claim 14, wherein the down sampling uses a down sampling ratio of four to one.

16. The method of claim 10, wherein the segmenting of the scan comprises:
separating the pixel values into background pixels and non-background pixels;
extracting each area of connected non-background pixels;
labeling each unextracted area of connected background pixels as belonging to the at least one background pixel area; and
labeling each extracted area of connected non-background pixels as belonging to one of a text pixel area and an image pixel area.

17. The method of claim 10, wherein the segmenting of the scan comprises:
separating the pixel values into background pixels and non-background pixels;
extracting each area of connected background pixels;
labeling each extracted area of connected background pixels as belonging to the at least one background pixel area; and
labeling each unextracted area of connected non-background pixels as belonging to one of a text pixel area and an image pixel area.

18. The method of claim 17, wherein the separating of the pixel values into background pixels and non-background pixels comprises creating a binary image of the scan using an adaptive thresholding process.

19. A method for background intensity correction of a scan of pixel values of a document, the scan having at least one background pixel area and at least one non-background pixel area, comprising:
segmenting the scan into the at least one background pixel area and the at least one non-background pixel area;
calculating a gray background pixel value of the at least one background pixel area, wherein the calculating depends upon at least one peak in a histogram of the pixel values of the at least one background pixel area; and
compensating only the pixel values of the at least one background pixel area for background intensity using the calculated gray background pixel value, wherein pixels in the at least one background pixel area are compensated by stretching the pixel values between zero and the at least one peak in the histogram, wherein the segmenting of the scan includes separating the pixel values into background pixels and non-background pixels and includes extracting pixels, wherein the separating of the pixel values into background pixels and non-background pixels includes creating a binary image of the scan using an adaptive thresholding process, and wherein the extracting of the pixels includes using binary morphology to extract each area of connected pixels which belong to one of a connected background pixel area and a connected non-background pixel area,
wherein at least one of the segmenting, calculating and compensating is performed by a scanning apparatus.

20. The method of claim 19, further comprising labeling each connected non-background pixel area as belonging to one of a text pixel area and an image pixel area using a size and an aspect ratio of each connected non-background pixel area.

* * * * *

UNITED STATES PATENT AND TRADEMARK OFFICE
CERTIFICATE OF CORRECTION

PATENT NO. : 7,668,394 B2 Page 1 of 1
APPLICATION NO. : 11/314934
DATED : February 23, 2010
INVENTOR(S) : Mohamed Ahmed It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1036 days.

Signed and Sealed this

Twenty-eighth Day of December, 2010

David J. Kappos
*Director of the United States Patent and Trademark Office*